(12) United States Patent
Shtein et al.

(10) Patent No.: US 11,151,467 B1
(45) Date of Patent: Oct. 19, 2021

(54) SYSTEM, METHOD, AND COMPUTER PROGRAM FOR GENERATING INTELLIGENT AUTOMATED ADAPTIVE DECISIONS

(71) Applicant: Amdocs Development Limited, Limassol (CY)

(72) Inventors: Moshe Yechiel Shtein, Hod Hasharon (IL); Gilad Barkan, Kfar Monash (IL); Pinchas Faran, Kadima-Tzoran (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 936 days.

(21) Appl. No.: 15/807,348

(22) Filed: Nov. 8, 2017

(51) Int. Cl.
*G06N 7/00* (2006.01)
*G06Q 30/02* (2012.01)
*G06N 20/00* (2019.01)

(52) U.S. Cl.
CPC .............. *G06N 7/00* (2013.01); *G06N 20/00* (2019.01); *G06Q 30/0204* (2013.01)

(58) Field of Classification Search
CPC ........ G06N 5/025; G06N 20/00; G06Q 50/06; G06Q 30/02; G06Q 30/0282; G06Q 30/0244
See application file for complete search history.

(56) References Cited

U.S. PATENT DOCUMENTS

| | | | |
|---|---|---|---|
| 7,720,782 B2 * | 5/2010 | Chaudhury | G06N 20/00 706/46 |
| 7,885,817 B2 | 2/2011 | Paek et al. | |
| 9,716,792 B2 | 7/2017 | McGann et al. | |
| 9,720,738 B2 | 8/2017 | Anghel et al. | |
| 9,723,151 B2 | 8/2017 | McGann et al. | |
| 10,332,015 B2 * | 6/2019 | Kawale | G06Q 30/0282 |
| 10,904,360 B1 * | 1/2021 | Govan | G06F 9/541 |
| 2014/0188565 A1 * | 7/2014 | Dantressangle | G06Q 50/06 705/7.33 |
| 2015/0012345 A1 * | 1/2015 | Bhagat | G06Q 30/02 705/14.16 |
| 2016/0132787 A1 * | 5/2016 | Drevo | G06N 20/00 706/12 |
| 2017/0046732 A1 | 2/2017 | Elmachtoub et al. | |
| 2017/0098236 A1 | 4/2017 | Lee et al. | |
| 2017/0103413 A1 * | 4/2017 | He | G06Q 30/0244 |
| 2017/0154268 A1 * | 6/2017 | Goldin | G06N 5/025 |
| 2018/0034842 A1 * | 2/2018 | Smyth | G06N 20/00 |
| 2018/0089592 A1 * | 3/2018 | Zeiler | G06F 16/212 |
| 2018/0349790 A1 * | 12/2018 | Cai | G06N 20/00 |
| 2019/0228362 A1 * | 7/2019 | Anagnostou | G06N 5/02 |
| 2020/0389417 A1 * | 12/2020 | Wetterwald | H04L 47/822 |

\* cited by examiner

*Primary Examiner* — Daniel T Pellett
(74) *Attorney, Agent, or Firm* — Zilka-Kotab, P.C.

(57) ABSTRACT

A system, method, and computer program product are provided for generating intelligent automated adaptive decisions. In operation, a system receives a request to generate a prediction associated with a business problem for a customer. The system identifies a customer segment from a plurality of customer segments to which the new customer is most closely associated. Additionally, the system identifies a statistical model associated with the customer segment. Moreover, the system selects a best prediction from a competing set of machine learning models and the statistical model, utilizing a multi arm bandit arbitrator applying a multi arm bandit technique to solve the business problem.

17 Claims, 8 Drawing Sheets

SYSTEM, METHOD, AND COMPUTER PROGRAM FOR GENERATING INTELLIGENT AUTOMATED ADAPTIVE DECISIONS

FIELD OF THE INVENTION

The present invention relates to adaptive machine decision making, and more particularly to a system for providing real time adaptive machine decision making.

BACKGROUND

Many domains, such as care and marketing, face common and high challenges for machine learning algorithms to exploit their potential in the smart selection of actions taken for potential customers. Issues, such as cold start and short lifespan of products, make supervised machine learning algorithms unsuitable.

The quality of any supervised machine learning system is highly dependent on (big enough) historical data, counts both for input features, as well as closing the loop with the target success feedback (i.e. the supervised part). However, for some use cases in the real world, such data, especially the feedback, is not available in learning mode, before deploying the system in production.

For example, for the use case of selecting the best product to offer to customers, customers' feedback is not available until a campaign has begun. This is referred to as the cold-start problem, well known not only for supervised learning but for recommendation systems as well.

Use case lifespan is sometimes too short to be able to wait for enough feedback to be aggregated to train a qualified high quality machine learning model. Thus, by the time one aggregates enough data for training, the use case may already expire, hence the machine learning model has not been activated at all.

There is thus a need for addressing these and/or other issues associated with the prior art.

SUMMARY

A system, method, and computer program product are provided for generating intelligent automated adaptive decisions. In operation, a system receives a request to generate a prediction associated with a business problem for a customer. The system identifies a customer segment from a plurality of customer segments to which the new customer is most closely associated. Additionally, the system identifies a statistical model associated with the customer segment. Moreover, the system selects a best prediction from a competing set of machine learning models and the statistical model, utilizing a multi arm bandit arbitrator applying a multi arm bandit technique to solve the business problem.

DETAILED DESCRIPTION

Figure 1:
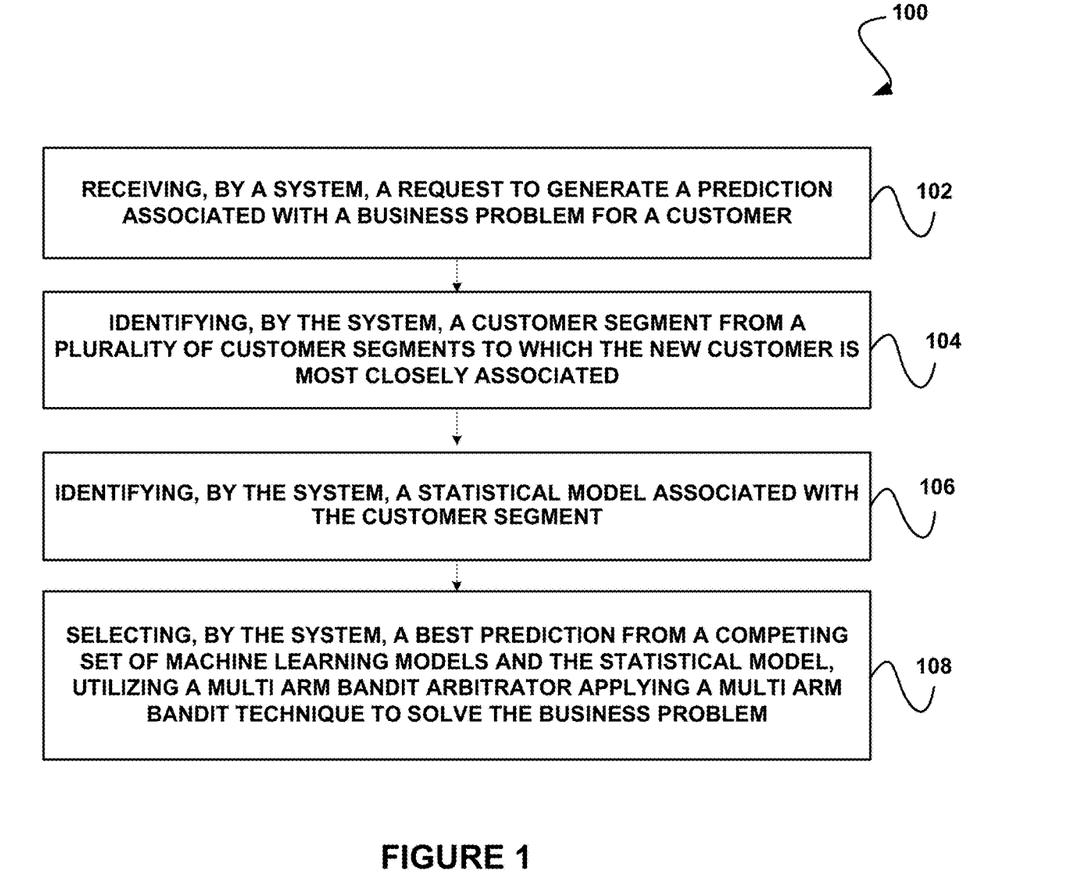
FIG. 1 illustrates a method for generating intelligent automated adaptive decisions, in accordance with one embodiment.

FIG. 1 illustrates a method 100 for generating intelligent automated adaptive decisions, in accordance with one embodiment.

In operation, a system receives a request to generate a prediction associated with a business problem for a customer. See operation 102. The business problem may include any problem, question, or decision associated with a customer journey. The customers may be associated with any industry. For example, in one embodiment, the customers may be associated with the telecommunications industry.

The system identifies a customer segment from a plurality of customer segments to which the new customer is most closely associated. See operation 104.

Additionally, the system identifies a statistical model associated with the customer segment. See operation 106.

Moreover, the system selects a best prediction from a competing set of machine learning models and the statistical model, utilizing a multi arm bandit arbitrator applying a multi arm bandit technique to solve the business problem. See operation 108. The multi arm bandit technique may include any technique, such as Thompson Sampling, etc.

In operation, the plurality of customer segments may be periodically generated. For example, the plurality of customer segments may be periodically generated by clustering an entire population of customers into distinct and mutual exclusive clusters utilizing a clustering model. Further, one statistical model may be generated per cluster by applying a multi arm bandit technique during a cold start period associated with the system. In this case, results of applying the multi arm bandit technique during the cold start period associated with the system may be stored as training observations for training a plurality of machine learning models from which the competing set of machine learning models are selected.

The system may also determine when enough of the training observations and the plurality of machine learning models exist to exit the cold start period and select a best performing model from the competing set of machine learning models and the statistical model, utilizing the multi arm bandit arbitrator applying the multi arm bandit technique to solve the business problem. A business outcome as a result of the best performing model may be utilized to train the plurality of machine learning models and the statistical model.

The system implementing the method 100 solves the cold-start problem for supervised learning by implementing a hybrid paradigm of fusing two approaches: on one hand, utilizing general statistics and on the other hand a personalized, supervised machine learning based approach, to compete with each other to eventually gain the best results.

There could be multiple decision points along the customer's journey. Each decision point has two or greater decision options (classes/categories) from which to choose.

For each such a decision point, there are several algorithms (e.g. stats-based, such as Thompson Sampling, or machine learning classification algorithms, such as logistic regression, etc.) that can decide the best option (class/ category) to from which to choose. The arbitrator implemented by the system chooses the best algorithm (i.e. the algorithm that maximizes a pre-defined success criteria).

Utilizing online feedback for the resulted actions, the system adapts over time, automatically arbitrating between the two approaches, by maximizing pre-defined key performance indicators (KPIs), using multi arm bandit techniques such as Thompson Sampling, etc. The system 100 has some refinement of personalization by formerly conducting unsupervised machine learning based clustering, segmenting the entire population into K different clusters (segments, where K is a positive integer) and running K different multi arm bandit techniques for these K clusters of customers.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
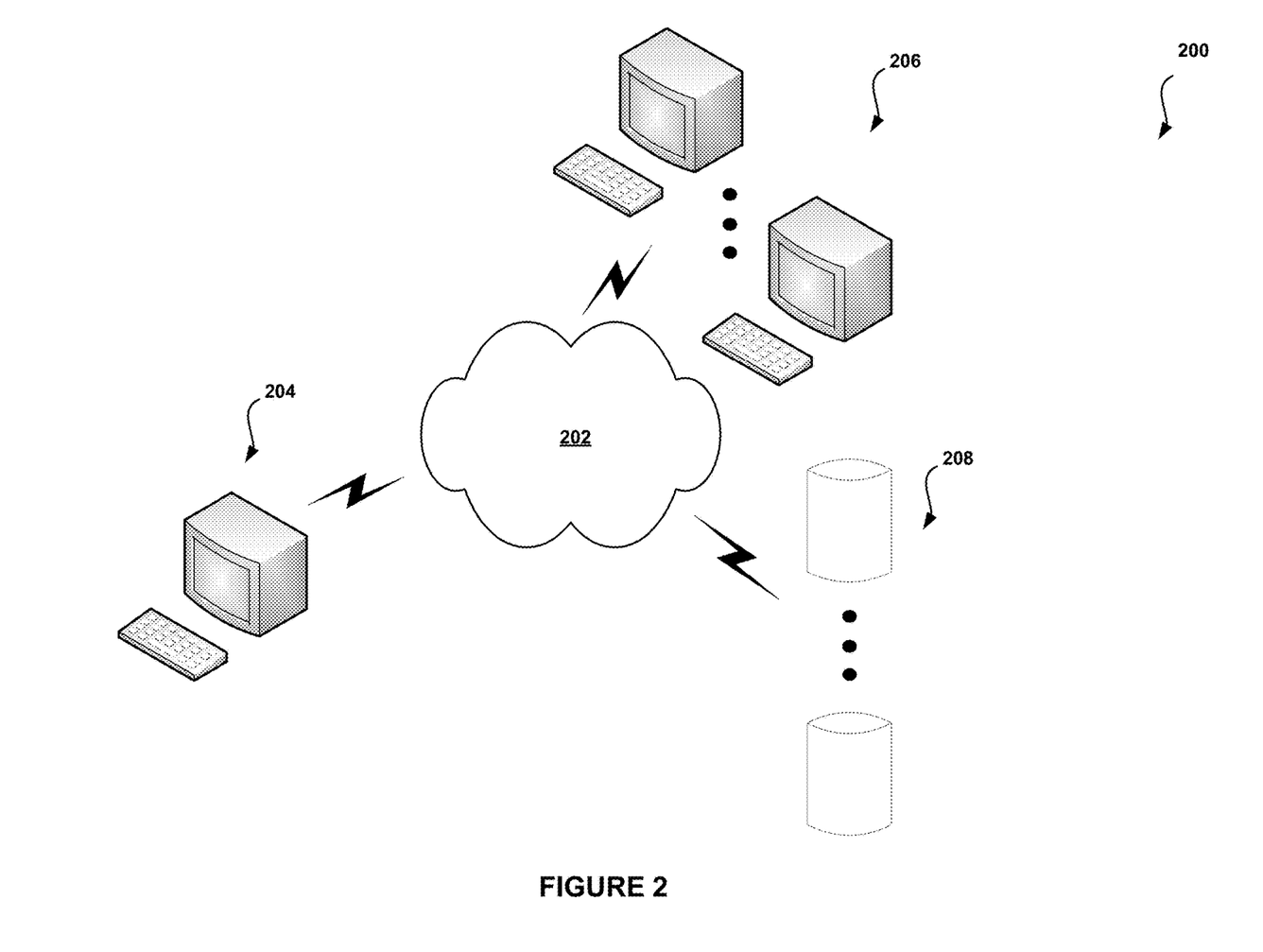
FIG. 2 shows a system for generating intelligent automated adaptive decisions, in accordance with one embodiment.

FIG. 2 shows a system 200 for generating intelligent automated adaptive decisions, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a Smart Selection system 204, which may implement a variety of applications or software, etc. The Smart Selection system 204 may be capable of communicating with a plurality of systems 206, either directly or over one or more networks 202, for generating intelligent automated adaptive decisions. The Smart Selection system 204 may also be in communication with one or more repositories/databases 208 (e.g. a model repository, etc.).

The Smart Selection system 204 is a big-data based hybrid system, which implements a combination of both machine learning and statistical based methods to overcome these challenges in order to make smart decisions about customers' journeys in an intelligent manners, by maximizing up-lift and return on investment (ROI). The Smart Selection system 204 functions by letting the different approaches compete each other for maximum gain, adjusting and continuously adapting accordingly towards the winner approach.

The Smart Selection system 204 solves the cold-start problem for supervised learning by implementing a hybrid paradigm of fusing two approaches. On one hand, the Smart Selection system 204 utilizes general statistics, and on the other hand, the Smart Selection system 204 utilizes a personalized supervised machine learning based approach. Use of this hybrid paradigm eventually leads to the best results.

Utilizing online feedback for the resulted actions, the Smart Selection system 204 adapts over time, automatically arbitrating between the two approaches, by maximizing pre-defined key performance indicators (KPIs), by using multi arm bandit techniques (e.g. such as Thompson Sampling, etc.).

In general, Thompson Sampling arbitrates among K different optional heuristics/models. In one embodiment, the Smart Selection system 204 may employ Thompson Sampling as one of the models.

Additionally, the Smart Selection system 204 may employ a Thompson Sampling model has some refinement of personalization, by formerly conducting machine learning based clustering and running K different Thompson Sampling models for the resulted K clusters.

The Smart Selection system 204 closes the loop internally within itself. For example, the Smart Selection system 204 detects, acquires, and correlates the feedbacks to the decisions made beforehand, and finally stores them in a persistent data store to be available for future on-going training. The Smart Selection system 204 defines KPIs to be used to optimize ROI based on predicted decisions.

Figure 3A:
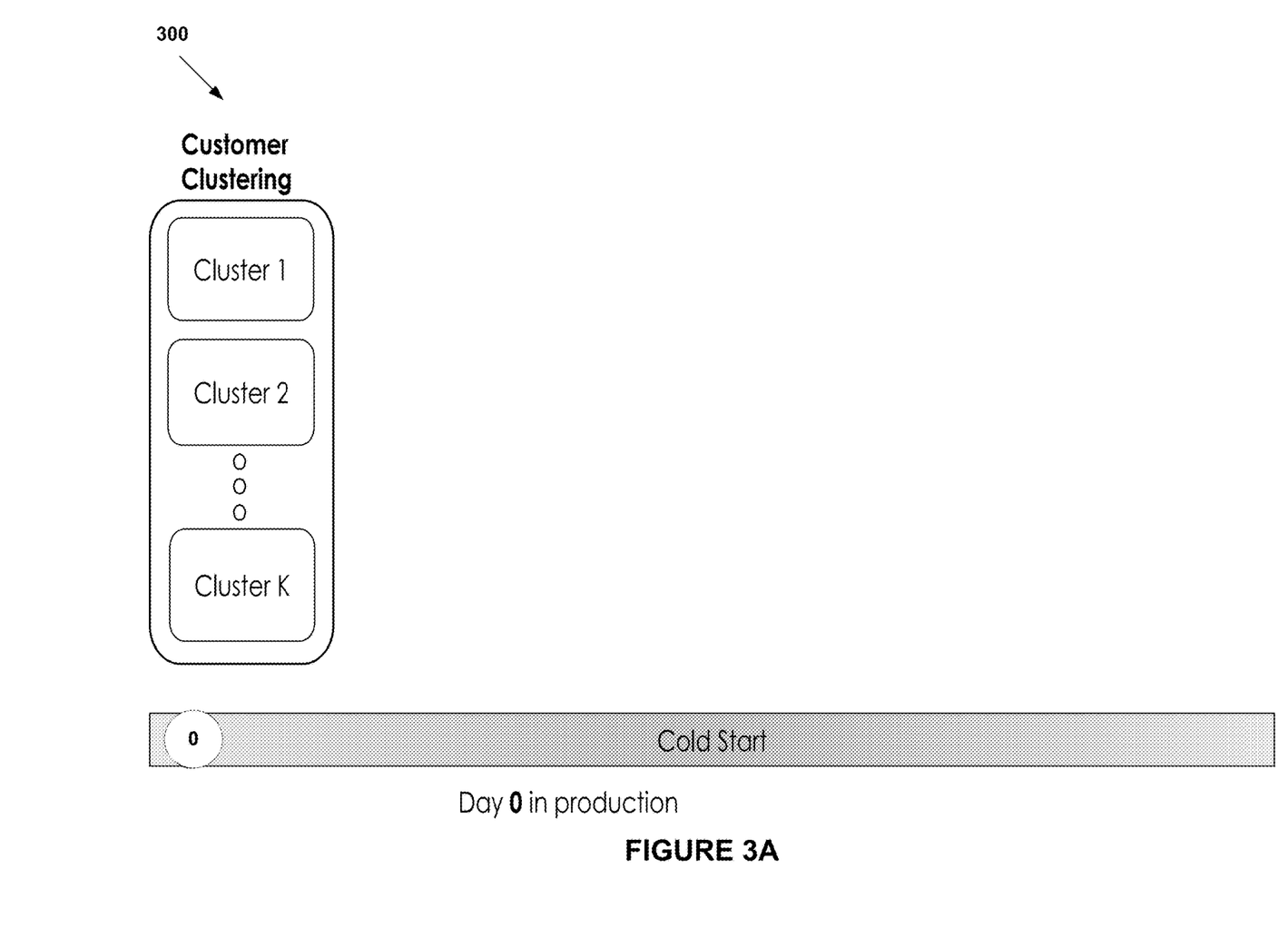
FIGS. 3A-3C show a system illustrating a Smart Selection machine learning architecture, in accordance with one embodiment.
Figure 3B:
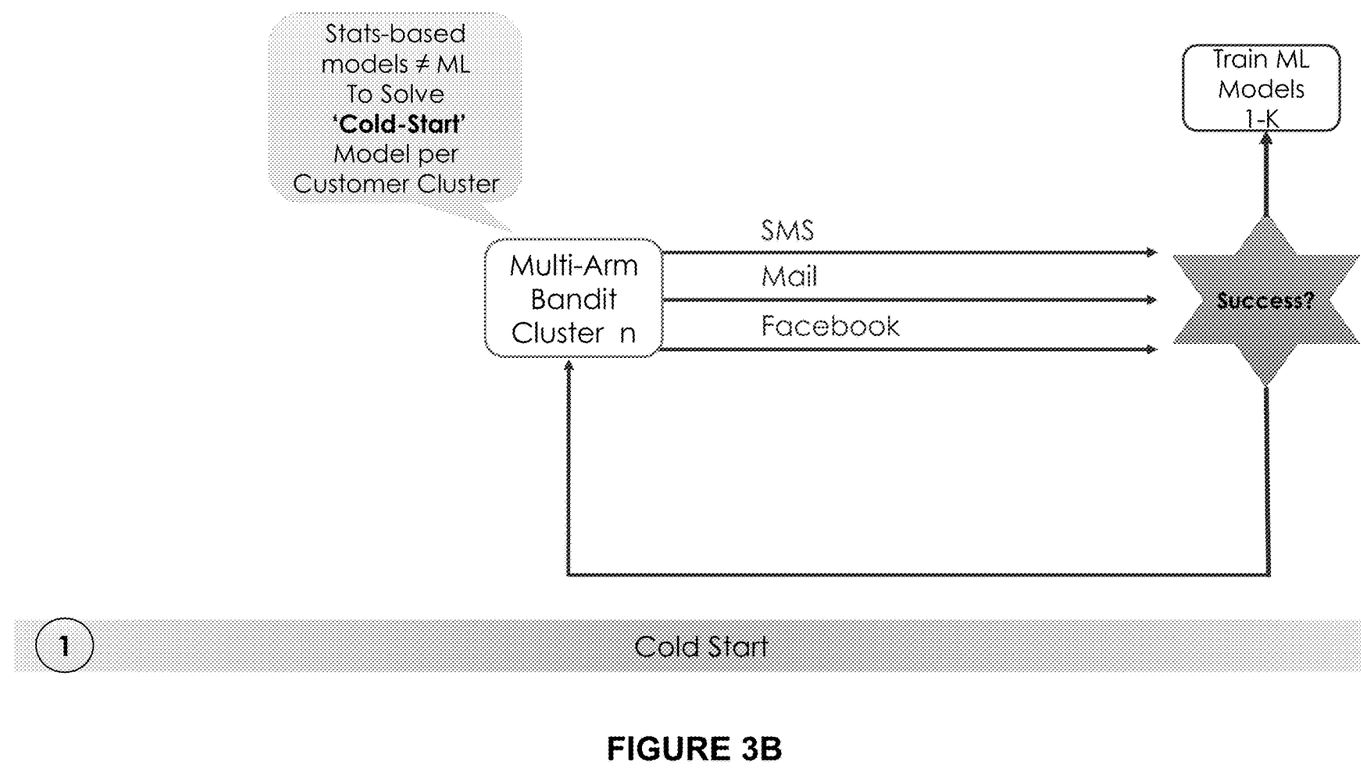
Figure 3C:
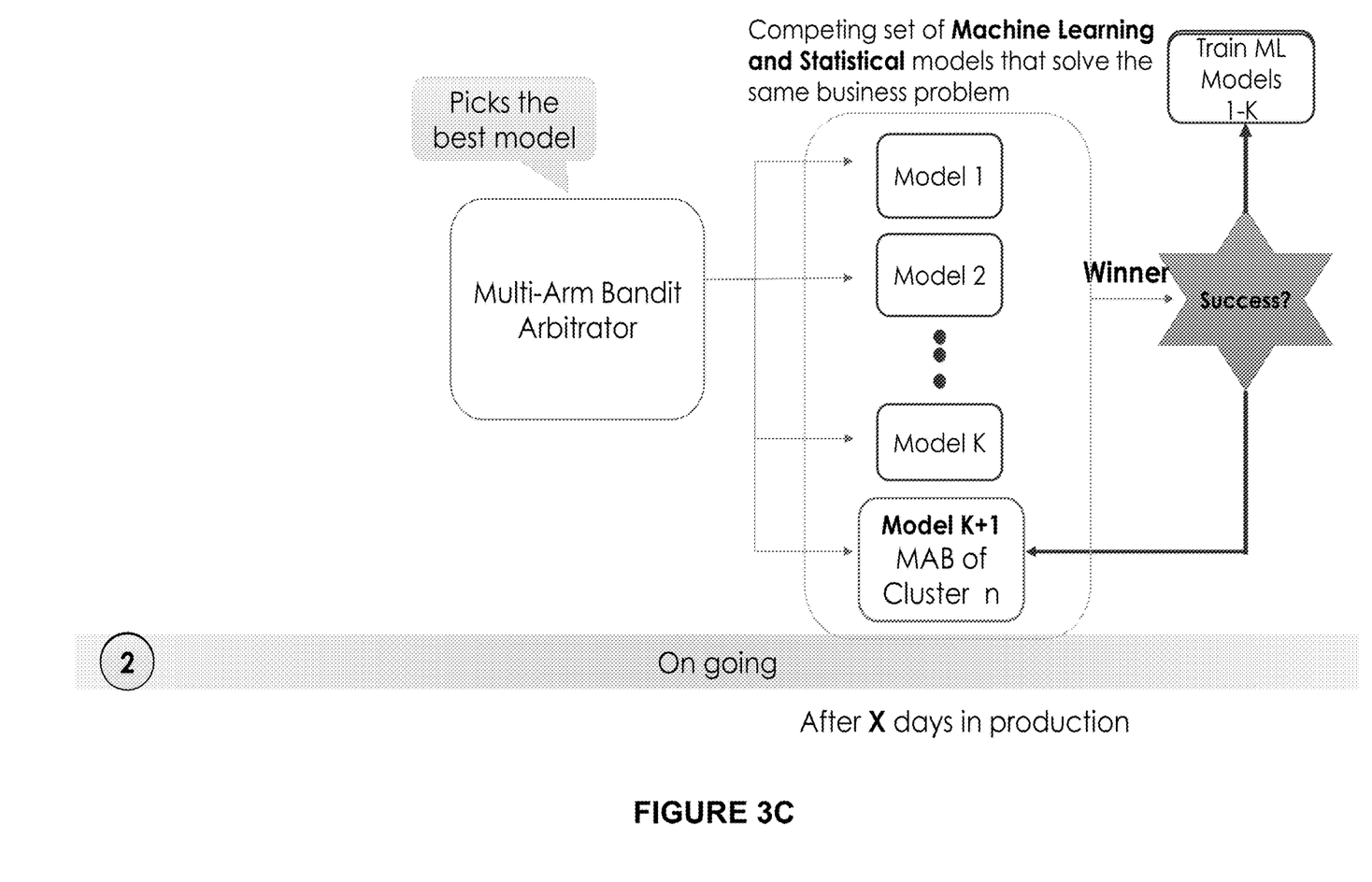

Thus, in one embodiment, the Smart Selection system 204 uses Thompson Sampling to arbitrate between two approaches: personalized machine learning and Thompson Sampling by itself. The system further personalizes the selection process by formerly conducting unsupervised machine learning based clustering, segmenting the entire population into K different clusters and running K different multi arm bandit techniques for these K clusters of customers FIGS. 3A-3C show a system flow diagram 300 illustrating a Smart Selection machine learning architecture, in accordance with one embodiment. As an option, the system 300 may be implemented in the context of the details of the previous figures and/or any subsequent figure(s). Of course, however, the system 300 may be implemented in the context of any desired environment. Further, the aforementioned definitions may equally apply to the description below.

In one embodiment, the overall Smart Selection machine learning architecture may be comprised of three main components. First, the Smart Selection machine learning architecture may include and implement a clusters based multi arm bandit based selector/predictor (used for cold start), that applies a multi arm bandit per customer cluster. The reason to use a multi arm bandit per cluster is in order to incorporate personalization into the multi arm bandit, since in contrast to machine learning, whose algorithms target 'segment-of-1' (i.e. specific customers), a multi arm bandit technique is based on statistics only (i.e. it is a single stats-based-model that takes whole population into a single pile of stats into account).

Second, the overall Smart Selection machine learning architecture may include an automatic model trainer that trains machine learning models based on observations of actual selections in production. Third, the Smart Selection architecture may include a multi arm bandit based arbitrator that selects/predicts the best model to use out of a set of the trained machined learning models plus the clustered multi arm bandit based model.

In operation, the Smart Selection machine learning architecture may perform prediction/selection by using clustering techniques to cluster customer populations into distinct clusters, as shown in FIG. 3A (Step 0).

As shown in FIG. 3B, each time that a new business problem is introduced, the selection is determined by the system using the clusters based multi arm bandit, by: first finding to which segment (cluster) the subscriber is closest; requesting a prediction for the appropriate closest segment's multi arm bandit; and logging the request along with the selected option to the training observations and to the multi arm bandit statistics (Step 1).

Once enough observations are collected and machine learning models are generated (as soon as the system has at least one valid model that its offline KPIs are good enough), the system starts to use the multi arm bandit based arbitrator to select the model that will produce the best results out of all available machine learning models (machine learning Models 1 through K) and the clusters based multi arm bandit model (Model K+1), as shown in FIG. 3C (Step 2).

Figure 4:
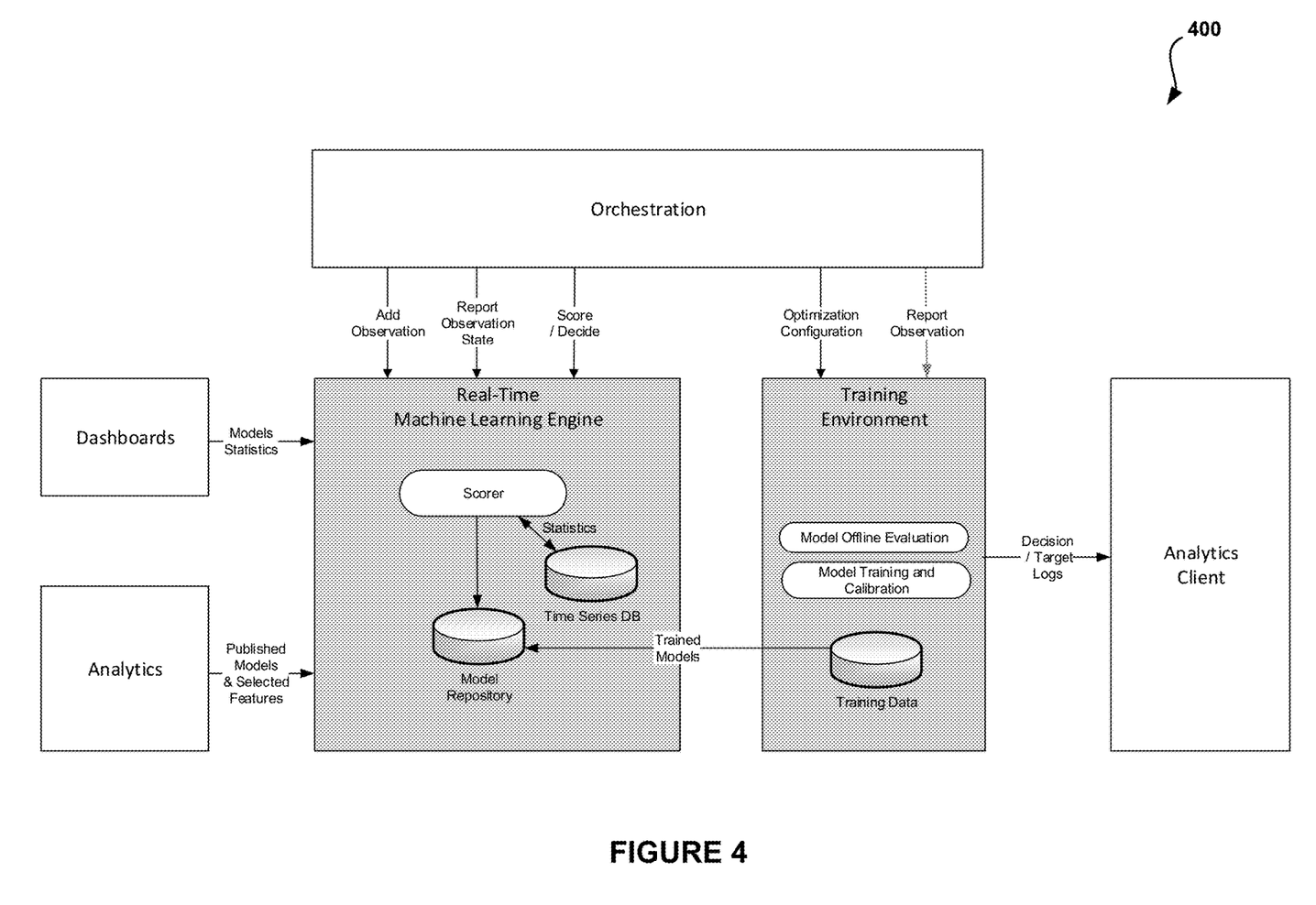
FIG. 4 shows a system illustrating a Smart Selection machine learning architecture, in accordance with one embodiment.

FIG. 4 shows a system 400 illustrating a Smart Selection machine learning architecture, in accordance with one embodiment. As an option, the system 400 may be implemented in the context of the details of the previous figures and/or any subsequent figure(s). Of course, however, the system 400 may be implemented in the context of any desired environment. Further, the aforementioned definitions may equally apply to the description below.

In operation, the system 400 may be used for generating intelligent automated adaptive decisions.

Customer population may be subject to diverse decision making/learning to serve different purposes (i.e. business problems) such as: selection of an option to optimize for a marketing/customer care target (e.g. the best engagement channel in a particular experience); and selection of a flow in an experience (customer journey) to optimize the experience's reward. Each business problem can be resolved using an optimization/model that is specific to it, and adapt as the conditions/behavior changes.

The system 400 provides the capability to automatically choose an option (from a selection of two or more) in a way that will optimize the outcome requested by the business user who designs the customer journey. The system 400 provides an automatic system decision on which "path" to select on the customer journey. In one embodiment, a business user may provide one or more targets to be provided to the learning mechanism (i.e. when a "Success" or a "Failed" result occurs, i.e. a milestone component).

As an example, $C=\{C_0 \ldots C_n\}$ may represent the population of Customers. Additionally, $B=\{B_0 \ldots B_m\}$ may represent available options for a particular decision and $P_{success}(B_j|C_i)$ may represent the probability of a successful outcome as a result of deciding upon option $B_j$, for Customer $C_i$. In this case, the system 400 builds predictive models to compute $P_{success}$. The predictive models used by the system 400 are fully automatic and adaptive. The system 400 is adaptive in that it uses all available information and the model corrects itself if there are changes in subscriber behavior. The system 400 begins to optimize as quickly as possible on any cold start situation. The system 400 balances between exploration/exploitation in order to maximize an expected result.

In operation, the overall procedure implemented by the system 400 may be divided into two processes, before and after production.

After production, the system 400 implements a cold start phase (0-X days in production). The system 400 uses a multi arm bandit technique only to arbitrate between the different classification options (e.g. SMS, Facebook, Mail, etc.). X+ days in production, the system 400 utilizes the initial multi arm bandit technique to compete with machine learning models and an additional ('second') multi arm bandit technique arbitrates between the original multi arm bandit technique and the machine learning models.

Before production, in contrast to machine learning, where algorithms target 'segment-of-1' (i.e. specific customers), the multi arm bandit technique is based on statistics only (i.e. it is a single stats-based-model that takes whole population into a single pile of stats into account). To incorporate personalization into the multi arm bandit technique, the system 400 splits (cluster/segment) the whole population into K sub-segments (clusters) and associates a specific multi arm bandit technique for each such sub-population.

In real-time, when the system 400 is requested to generate a prediction for a new customer: the system first determines to which segment (cluster) the subscriber is closest; requests for a prediction from the appropriate closest segment's multi arm bandit technique; requests for a prediction from all available machine learning models; and chooses the best/winner prediction out of the multi arm bandit-machine learning predictions.

Figure 5:
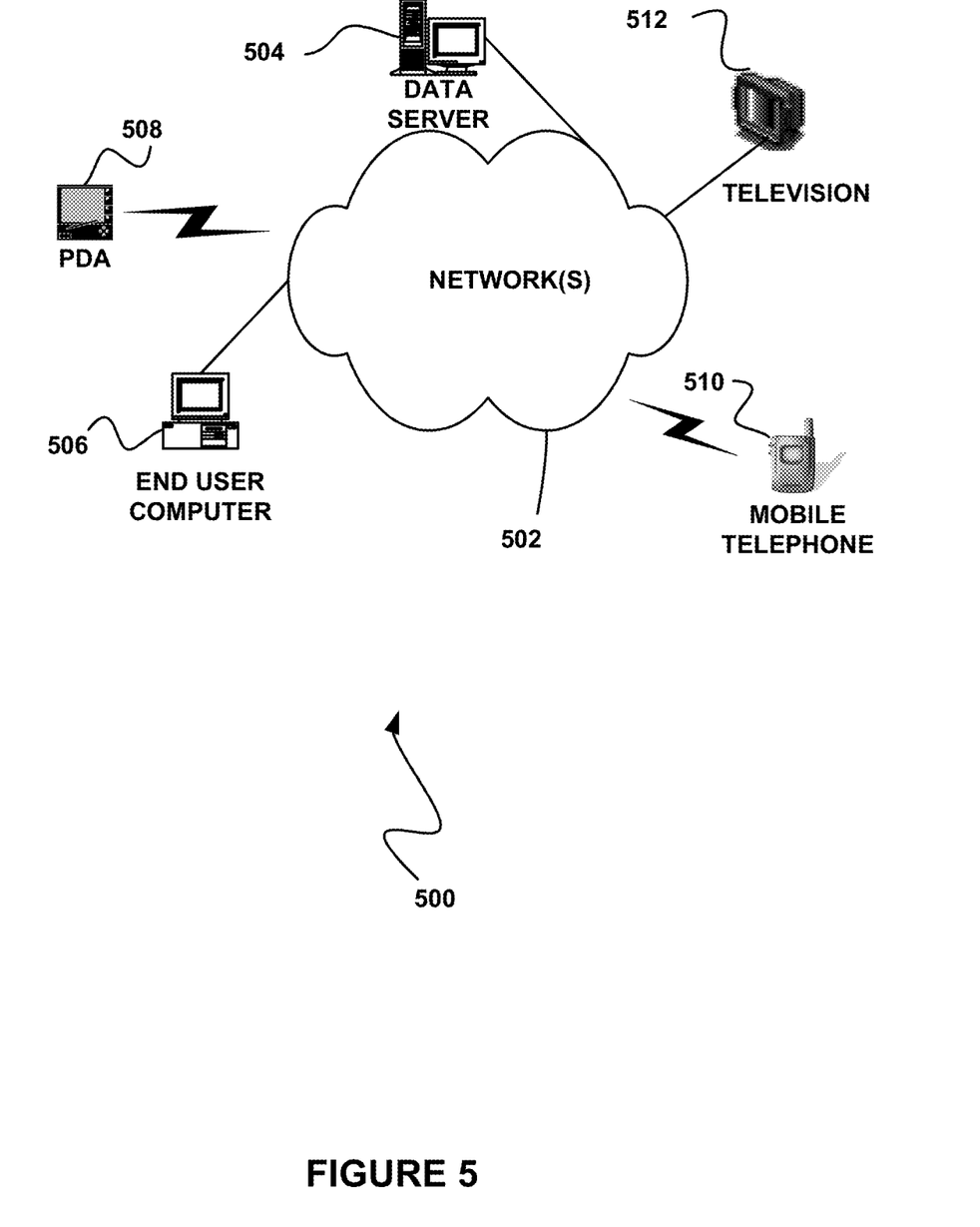
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
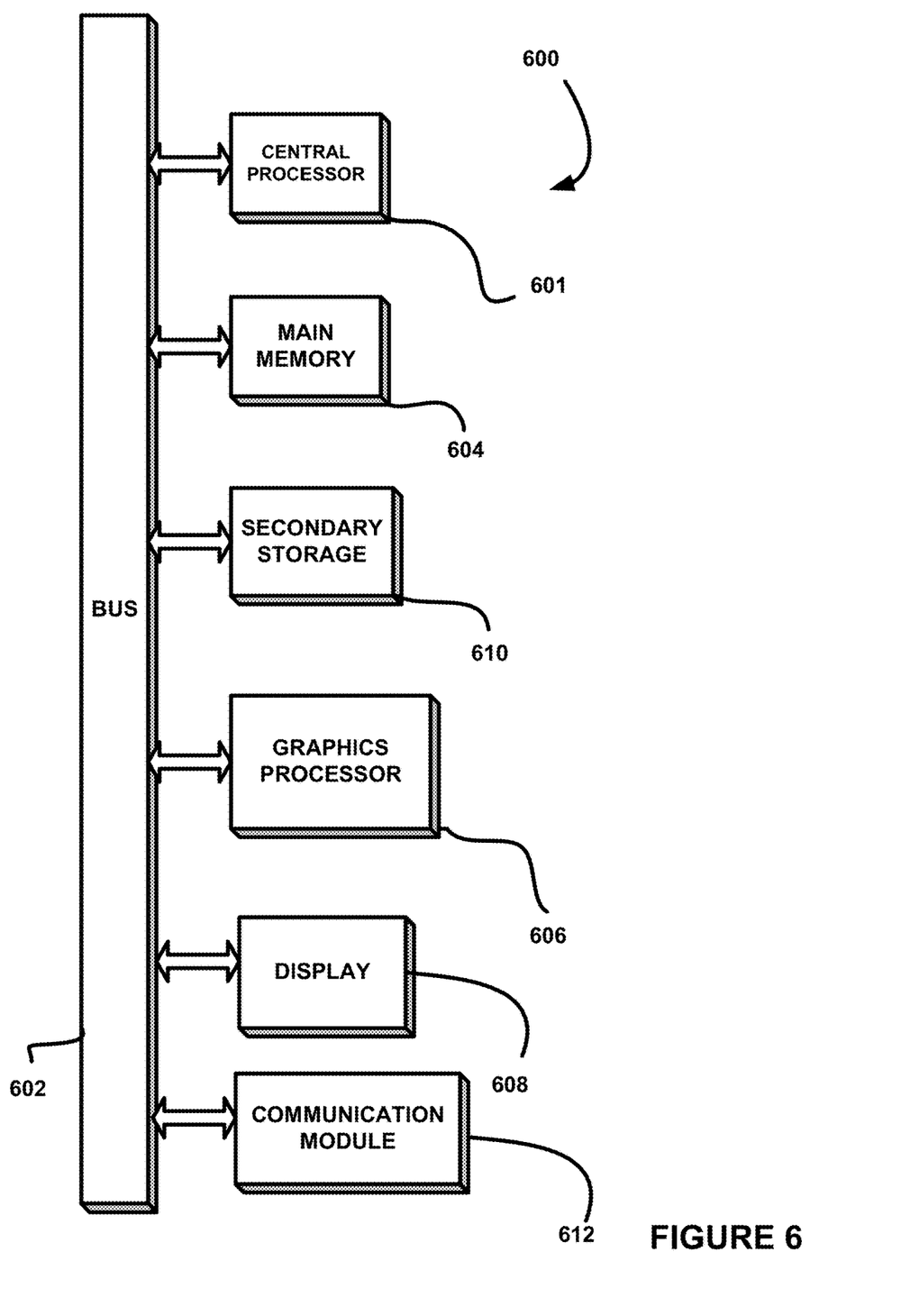
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   generating, by a system, a plurality of customer segments by clustering an entire population of customers into distinct and mutual exclusive clusters utilizing a clustering model;
   receiving, by the system, a request to generate a prediction associated with a new business problem for a new customer;

selecting, by the system, a customer segment from the plurality of customer segments to which the new customer is most closely associated;

identifying, by the system, a statistical model associated with the selected customer segment;

obtaining, by the system, a prediction of a solution to the new business problem output by the statistical model;

obtaining, by the system, a plurality of additional predictions of solutions to the new business problem, each additional prediction of the plurality of additional predictions output by a different machine learning model in a set of competing machine learning models; and applying, by the system, a multi arm bandit technique of a multi arm bandit arbitrator to the prediction output by the statistical model and the plurality of additional predictions output by the set of competing machine learning models, to select a best prediction from among the prediction output by the statistical model and the plurality of additional predictions output by the set of competing machine learning models.

2. The method of claim 1, wherein the plurality of customer segments are periodically generated.

3. The method of claim 1, wherein one statistical model is generated per cluster by applying the multi arm bandit technique during a cold start period associated with the system.

4. The method of claim 3, wherein results of applying the multi arm bandit technique during the cold start period associated with the system are stored as training observations for training a plurality of machine learning models including the set of competing machine learning models.

5. The method of claim 4, wherein the system determines when enough of the training observations and the plurality of machine learning models exist to exit the cold start period and selects the best prediction of a best performing model from the set of competing machine learning models and the statistical model, utilizing the multi arm bandit arbitrator applying the multi arm bandit technique to solve the business problem.

6. The method of claim 5, wherein a business outcome as a result of the best performing model is utilized to train the plurality of machine learning models and the statistical model.

7. A computer program product embodied on a non-transitory computer readable medium, comprising computer code for:

generating, by a system, a plurality of customer segments by clustering an entire population of customers into distinct and mutual exclusive clusters utilizing a clustering model;

receiving, by the system, a request to generate a prediction associated with a new business problem for a new customer;

selecting, by the system, a customer segment from the plurality of customer segments to which the new customer is most closely associated;

identifying, by the system, a statistical model associated with the selected customer segment;

obtaining, by the system, a prediction of a solution to the new business problem output by the statistical model;

obtaining, by the system, a plurality of additional predictions of solutions to the new business problem, each additional prediction of the plurality of additional predictions output by a different machine learning model in a set of competing machine learning models; and applying, by the system, a multi arm bandit technique of a multi arm bandit arbitrator to the prediction output by the statistical model and the plurality of additional predictions output by the set of competing machine learning models, to select a best prediction from among the prediction output by the statistical model and the plurality of additional predictions output by the set of competing machine learning models.

8. The computer program product of claim 7, wherein the plurality of customer segments are periodically generated.

9. The computer program product of claim 7, wherein one statistical model is generated per cluster by applying the multi arm bandit technique during a cold start period associated with the system.

10. The computer program product of claim 9, wherein results of applying the multi arm bandit technique during the cold start period associated with the system are stored as training observations for training a plurality of machine learning models including the set of competing machine learning models.

11. The computer program product of claim 10, wherein the system determines when enough of the training observations and the plurality of machine learning models exist to exit the cold start period and selects the best prediction of a best performing model from the set of competing machine learning models and the statistical model, utilizing the multi arm bandit arbitrator applying the multi arm bandit technique to solve the business problem.

12. The computer program product of claim 11, wherein a business outcome as a result of the best performing model is utilized to train the plurality of machine learning models and the statistical model.

13. A system, comprising one or more processors, operable for:

generating, by the system, a plurality of customer segments by clustering an entire population of customers into distinct and mutual exclusive clusters utilizing a clustering model;

receiving, by the system, a request to generate a prediction associated with a new business problem for a new customer;

selecting, by the system, a customer segment from the plurality of customer segments to which the new customer is most closely associated;

identifying, by the system, a statistical model associated with the selected customer segment;

obtaining, by the system, a prediction of a solution to the new business problem output by the statistical model;

obtaining, by the system, a plurality of additional predictions of solutions to the new business problem, each additional prediction of the plurality of additional predictions output by a different machine learning model in a set of competing machine learning models; and applying, by the system, a multi arm bandit technique of a multi arm bandit arbitrator to the prediction output by the statistical model and the plurality of additional predictions output by the set of competing machine learning models, to select a best prediction from among the prediction output by the statistical model and the plurality of additional predictions output by the set of competing machine learning models.

14. The system of claim 13, wherein the plurality of customer segments are periodically generated.

15. The system of claim 13, wherein one statistical model is generated per cluster by applying the multi arm bandit technique during a cold start period associated with the system.

16. The system of claim 15, wherein results of applying the multi arm bandit technique during the cold start period associated with the system are stored as training observations for training a plurality of machine learning models including the set of competing machine learning models.

17. The system of claim 16, wherein the system determines when enough of the training observations and the plurality of machine learning models exist to exit the cold start period and selects the best prediction of a best performing model from the set of competing machine learning models and the statistical model, utilizing the multi arm bandit arbitrator applying the multi arm bandit technique to solve the business problem.

\* \* \* \* \*